(12) United States Patent
Garrett et al.

(10) Patent No.: US 8,575,294 B2
(45) Date of Patent: Nov. 5, 2013

(54) HIGH BIO CONTENT HYBRID NATURAL OIL POLYOLS AND METHODS THEREFOR

(76) Inventors: Thomas M. Garrett, Corona, CA (US); Xian Xian Du, Pittsburg, KS (US)

( * ) Notice: Subject to any disclaimer, the term of this patent is extended or adjusted under 35 U.S.C. 154(b) by 0 days.

(21) Appl. No.: 12/927,054

(22) Filed: Nov. 5, 2010

(65) Prior Publication Data

US 2011/0060115 A1 Mar. 10, 2011

Related U.S. Application Data

(63) Continuation-in-part of application No. 12/462,024, filed on Jul. 28, 2009, and a continuation-in-part of application No. 11/524,603, filed on Sep. 21, 2006, now Pat. No. 7,674,925.

(60) Provisional application No. 61/401,372, filed on Aug. 12, 2010.

(51) Int. Cl.
C08G 18/00 (2006.01)

(52) U.S. Cl.
USPC .............. 528/74.5; 528/59; 528/64; 528/85; 252/182.2; 252/182.21; 252/182.22; 252/182.23; 252/182.24; 252/182.27; 252/182.28

(58) Field of Classification Search
USPC .............. 252/182.2, 182.21, 182.22, 182.23, 252/182.24, 182.27, 182.28; 528/59, 64, 528/74.5, 85
See application file for complete search history.

(56) References Cited

U.S. PATENT DOCUMENTS

| | | | |
|---|---|---|---|
| 2,882,249 A | 4/1959 | Posnansky | |
| 3,179,625 A * | 4/1965 | Ehrhart | 528/48 |
| 3,485,779 A | 12/1969 | Gast et al. | |
| 4,025,477 A | 5/1977 | Borden et al. | |
| 4,094,838 A | 6/1978 | Schneider et al. | |
| 4,174,329 A | 11/1979 | Bell et al. | |
| 4,508,853 A | 4/1985 | Kluth et al. | |
| 4,551,517 A | 11/1985 | Herold et al. | |
| 4,742,087 A | 5/1988 | Kluth et al. | |
| 4,886,893 A | 12/1989 | Meffert et al. | |
| 5,266,714 A | 11/1993 | Stoll et al. | |
| 5,302,626 A | 4/1994 | Hoefer et al. | |
| 5,334,673 A * | 8/1994 | Wu | 473/378 |
| 5,476,969 A | 12/1995 | Hinz et al. | |
| 6,107,433 A | 8/2000 | Petrovic et al. | |
| 6,121,398 A | 9/2000 | Wool et al. | |
| 6,180,686 B1 | 1/2001 | Kurth | |
| 6,433,121 B1 | 8/2002 | Petrovic et al. | |
| 6,433,125 B1 | 8/2002 | Gruetzmacher et al. | |
| 6,573,354 B1 | 6/2003 | Petrovic et al. | |
| 6,686,435 B1 | 2/2004 | Petrovic et al. | |
| 6,762,274 B2 | 7/2004 | Waddington et al. | |
| 6,891,053 B2 | 5/2005 | Chasar et al. | |
| 6,924,321 B2 | 8/2005 | Casati et al. | |
| 2006/0041157 A1 | 2/2006 | Petrovic et al. | |
| 2011/0086215 A1 * | 4/2011 | Casati et al. | 428/304.4 |

OTHER PUBLICATIONS de Kraker, J.W. ; Schurink, M.; Franssen, M.C.R. ; Konig, W. A; de Groot, A.; and Bouwmeester, H.J.. "Hydroxylation of Sesquiterpenes by Enzymes From Chicory (*Cichorium intybus* L.) Roots." *Tetrahedron*, 59(2003), pp. 409-418.

Cirino, P.C. and Arnold, F.H. "Regioselectivity and Activity of Cytochrome P450 BM-3 and Mutant F87A in Reactions Driven by Hydrogen Peroxide." *Advance Synthetics Catalog* 344, No. 9(2002), pp. 932-937.

Groves, J.T. and Viski, P.. " Asymmetric Hydroxylation by a Chiral Iron Porphyrin." *Journal of American Chemistry Society* 111(1989), pp. 8537-8538.

Balandrian, M. F.; Klocke, J.A.; Wurtele, E.S. ; Bollinger, W.H.. "Natural Plant Chemicals: Sources of Industrial and Medicinal Materials." *Science*, 228(1985), pp. 1154-1160.

Findly, T.W.; Swern, D. and Scanlan, J.T.. " Epoxidation of Unsaturated Fatty Materials with Peracetic Acid in Glacial Acetic Acid Solution." *Journal American Chemistry Society*, vol. 67(1945), pp. 412-414.

Gast, L.E., et al. "Polyesteramides from linseed and soybean oils for protective coatings: Diisocyanate-modified polymers." Journal of the American Oil Chemists' Society, vol. 46, No. 7, Jul. 1969. Web. Jul. 8, 2009.

* cited by examiner

Primary Examiner — Michael L Leonard
(74) Attorney, Agent, or Firm — John C. McMahon

(57) ABSTRACT

Methods of producing a hybrid petro-plant oil polyol having a high bio-content by coupling a petro-chemical polyol with a plant oil based polyol is provided, including coupling an intermediate petro-polyol prepolymer with a plant oil polyol so as to synthesize a hybrid petro-plant oil polyol having a high bio-content and a hydroxyl number of between about 50 and 60.

24 Claims, No Drawings

HIGH BIO CONTENT HYBRID NATURAL OIL POLYOLS AND METHODS THEREFOR

CROSS-REFERENCE TO RELATED APPLICATIONS

This claims the benefit of U.S. Provisional Application No. 61/401,372, filed Aug. 12, 2010 and is incorporated by reference herein. This application is also a continuation-in-part of U.S. patent application Ser. No. 11/524,603, now U.S. Pat. No. 7,674,925, which issued on Mar. 9, 2010 and is incorporated by reference herein. This application is a continuation-in-part of U.S. patent application Ser. No. 12/462,024, filed Jul. 28, 2009 and is incorporated by reference herein.

BACKGROUND OF THE INVENTION

The present application relates to the conversion of plant, oils to polyols suitable for use as raw materials in the manufacture of polyurethanes, and in particular to such conversions utilizing a synthetic pathway that does not include an epoxidation process.

The manufacture of polyurethanes from polyisocyanates requires readily available co-reactants at reasonable prices. These materials are known in the art as polyols. Polyols may be defined as reactive substances, usually liquids, that contain at least two isocyanate-reacting groups attached to a single molecule. Such isocyanate reacting groups are also known as "active hydrogen" groups as they typically give a hydrogen atom to the isocyanate nitrogen to form a urethane. For example, an alcohol group includes an active hydrogen and reacts with isocyanate to form a urethane as shown below:

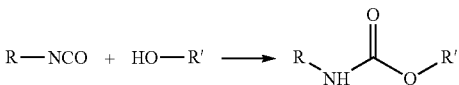

Billions of pounds of polyols are used each year to manufacture polyurethanes. Most of these polyols are polyether polyols derived from fossil fuels, typically polyethylene oxide or polypropylene oxide based polyols. As the price of oil has increased, so has the price of polyether polyols. Therefore, it has become more desirable to explore alternative sources of polyols, including agriculturally derived products such as plant oils.

Plant oils are primary metabolites of many higher plants that are economically important as sources of food and industrial oils. Chemically, plant oils are triglycerides of mixtures of fatty acids. Typically, they contain some unsaturated fatty acids. Soybean oil, for example, contains about 54 wt. % linoleic acid, 23 wt. % oleic acid, 10 wt. % palmitic acid, 8 wt. % linolenic acid and 5 wt. % stearic acid. On average, soybean oil contains 4.65 sites of unsaturation (olefin groups, carbon-carbon double bonds) per molecule. If active hydrogen functional groups, such as alcohols, are introduced into the molecule of plant oil, the product can be used as a polyol to make polyurethane.

Many plant oils, such as corn oil, soybean oil, rapeseed oil, sunflower oil, peanut oil, safflower oil, olive oil, and cotton seed oil exist in abundant supply. This abundance could yield low cost polyols if the plant oils could be functionalized with active hydrogen groups, such as alcohols, without the problems inherent in the epoxide synthetic pathway currently used in the production of most plant polyols. For example, almost all of the commercially available polyols made from soybean oil are manufactured in a two step process beginning with the epoxidation of soybean oil. Such process is well known in the art, and may be shown as follows:

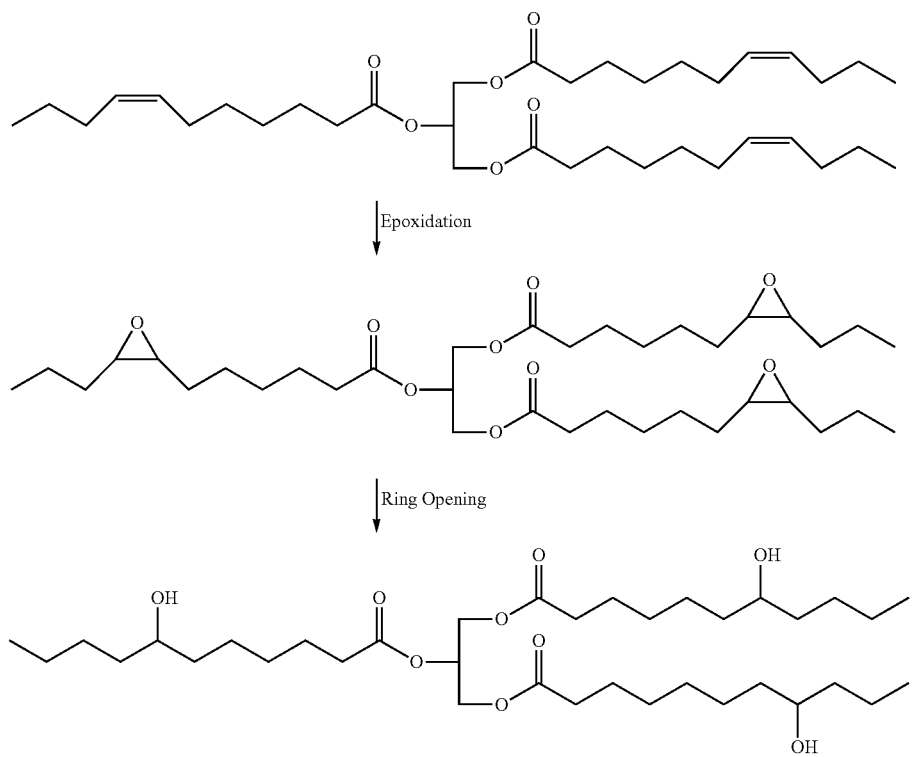

In the above-identified pathway, hydroxyl groups are introduced onto the molecule of soybean oil in the second process step by opening the oxirane of epoxidized soybean oil to form soy polyol. This may be accomplished in a variety of ways. For example, U.S. Pat. No. 2,882,249 describes the soy polyol formed by ring opening epoxidized soybean oil with ricinoleic acid. U.S. Pat. No. 4,025,477 describes the soy polyol obtained by ring opening epoxidized soybean oil with acrylic acid. U.S. Pat. Nos. 5,266,714 and 5,302,626 describe soy polyols obtained by ring opening epoxidized soybean oil with carboxylic acids. U.S. Pat. No. 6,891,053 describes the soy polyol obtained by ring opening epoxidized soybean oil with acid leached clay. U.S. Pat. Nos. 4,508,853 and 4,742,087 describe the soy polyol obtained by ring opening epoxidized soybean oil with alcohols. U.S. Pat. Nos. 6,433,125 and 4,551,517 describe soy polyols obtained by ring opening epoxidized soybean oil with higher alcohols. U.S. Pat. No. 4,886,893 describes the soy polyol obtained by ring opening epoxidized soybean oil with polyfunctional alcohols. U.S. Pat. Nos. 6,107,433, 6,433,121, 6,573,354 and 6,686,435 describe the soy polyols obtained by ring opening epoxidized soybean oil with a mixture of water, alcohol and fluoroboric acid.

Epoxidized soybean oils used to manufacture soy polyols typically have epoxide numbers of from about 4.8 to about 7.2. If the epoxide number of epoxidized soybean oil is too low, the hydroxylation reaction will give a soy polyol that contains an undesirable concentration of by-products having zero and mono hydroxy group molecules. Soy polyol containing zero and mono hydroxyl group molecules result in polyurethanes with poor physical properties. If the epoxide number of the epoxidized soybean oil is too high, the hydroxylation reaction will produce a soy polyol product that contains an undesirably large concentration of by-product having intramolecular cross-linked molecules. High concentrations of by-products containing intramolecular cross-linking unacceptably increases the viscosity of the soy polyols as well as detrimentally affecting the physical properties of the polyurethane products. In fact, it is known in the art that ring opening, for example, via hydroxylation of epoxidized plant oils, results in a variety of complex by-products, including, but not limited to intra-molecular cross-linked by-products, intermolecular cross-linked by-products, hydrolysis by-products and alcohol exchange by-products. Furthermore, even the expected or planned products of epoxidized plant oils may be poor reactors, such as secondary hydroxyl groups in the middle of fatty acid chains, which may be high in stearic hindrance.

Currently, manufacturers seeking to use plant oil polyols, such as soybean oil-derived polyols, to produce polyurethane, typically must choose between inexpensive, high viscosity raw materials that are dark in color or expensive, low viscosity, lighter colored materials. Products from both materials may have poor physical properties that limit market acceptance. Furthermore, such poor properties may limit the amounts such materials are added to polyurethane formulations. Ideally, a plant polyol reactant would be a low cost, low viscosity and light colored raw material comparable to those derived from fossil fuels. However, because of the problems inherent in opening the epoxide ring of epoxidized plant oils, such as epoxidized soybean oil, such physical properties are not possible with the currently available technology.

It is noted that it is known in the art to hydroxylate hydrocarbons by biological methods. However, to date, such processes have proven uneconomical. Also, some plant oils can be used as polyols without modification. For example, castor oil contains on average about 2.7 hydroxyl groups per molecule. However, the supply of castor oil is limited and properties of polyurethanes made from such polyols (such as resilience) are not equal to those of fossil fuel derived materials.

Certain polyols may be derived from plant sources. For example polytetramethylene glycol (PTMEG) is derived from polymerizing tetrahydrofuran (THF) from corn. Such polyols yield polyurethanes with excellent physical properties and are thus superior raw materials. However, to date, the high cost of producing these polyols has resulted in limited market acceptance.

It is noted that Gast et al., U.S. Pat. No. 3,485,779 (hereafter the '779 patent) discloses reactions of hydroxylamines with triglycerides. Specifically that linseed and soybean N,N-bis-hydroxyalkyl fatty amides can be obtained by a strong base sodium methoxide catalyzed aminolysis of linseed oil and soybean oil. Such a reaction may be set forth as follows:

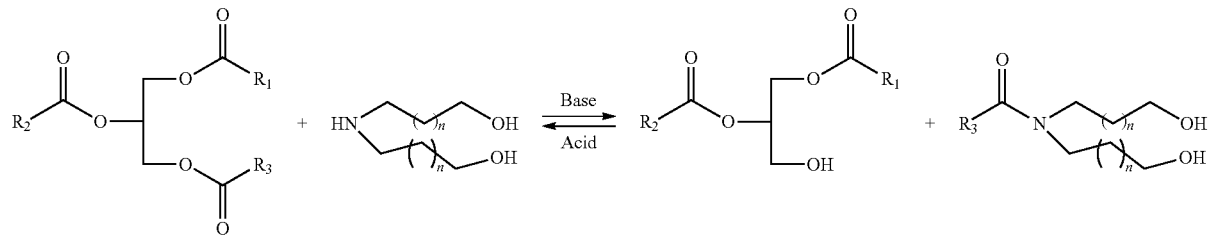

It is further noted that the '779 patent reports that reactions of that invention are inhibited by HX.

Schneider et al., U.S. Pat. No. 4,094,838 (hereafter the '838 patent) discloses soybean N,N,-bis-hydroxy ethyl fatty amide that can be used to make water-dispersible polyurethane coatings as a small molecule polyol of polyurethane resin. The '838 patent teaches diethanolamine as a preferred amidating agent in a base catalyzed aminolysis. The preferred catalyst being sodium methoxide.

SUMMARY OF THE INVENTION

The present invention provides new types of plant derived high molecular weight polyols having hydroxyl groups with about 100% high reactivity and new methods for their manufacture.

Plant-based polyols according to the invention are a reaction product of at least one plant oil having at least one carbon-carbon double bond and a reactant having at least one nucleophilic functional group and at least one active hydrogen functional group, the reaction being performed in the presence of an addition reaction catalyst. Polyurethanes of the invention are prepared by reaction mixture of polyols of the invention with an isocyanate.

According to methods of the invention, the unsaturated sites in plant polyols are directly functionalized to yield polyols in a one-step process. For example, hydrogen groups, such as hydroxyls are efficiently and directly added to the olefin groups of plant oils. Such reactions according to the invention proceed without epoxidation, thereby avoiding challenges and problems inherent in the epoxide synthetic pathway.

OBJECTS OF THE INVENTION

Therefore, an object of the present invention is to provide compositions and methods that solve one or more of the problems described above. Another object of the invention is to provide compositions and methods that utilize renewable resources, such as agriculturally derived plant oils, for conversion into high molecular weight polyols that can be used as raw materials in the manufacture of polymers, such as polyurethanes. A further object of the invention is to provide such plant polyols that are highly reactive, lack steric hindrance, are of low cost, low viscosity and are light in color. Another object of the invention is to provide high molecular weight plant polyols in a process that results in a low number of by-products. A further object is to provide such compositions and methods that exhibit properties similar to petroleum-based reactants. Furthermore, an object of the invention is to provide methods, reactants and products made therefrom that are inexpensive to produce and especially well adapted for the intended usage thereof.

Other objects and advantages of this invention will become apparent from the following description that sets forth, by way of illustration and example, certain embodiments of this invention.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention.

According to a method of the invention, a process of synthesizing a hybrid petro-plant oil polyol having a high bio-content and a hydroxyl number of between about 50 and 60 is provided. Such hybrid petro-plant oil polyols fabricated by the methods of the present invention may be used in the fabrication of many high performance materials that are currently made with petro polyols and cannot currently be made with soy polyols, such as but not limited to visco-elastic foams and high performance cast elastomers. Hybrid petro-plant oil polyols fabricated by the methods of the present invention may be used in a variety of low temperature applications such as spray-in-lace foam, wherein soy polyols become gelatinous at the working temperatures.

A hybrid petro-plant oil polyol is a polyol including a petro polyol component and a plant oil polyol component. As is understood in the art, petro polyols are substantially interchangeable for one another in many formulations. Stated another way, petro polyols can be "dropped in" or directly replaced for one another in a substantial number of polyol formulations. Plant oil polyols, such as but not limited to soy polyols, do not readily "drop in," so that each plant oil polyol product must be completely reformulated. A hybrid petro-plant oil polyol, which includes both petro and plant polyol components, may include the advantages of soy polyols and the ability to "drop in" to an existing petro polyol formulation.

The phrase "high bio-content" may have various meanings, depending upon the nature of the user and the context. For example, the USDA's bio-preferred program lists a roofing material with 10% bio-content as being "high," simply because it is the current highest commercially available known to them. However, as used herein, the phrase "bio-content" is a broad term, and is to be given its ordinary and customary meaning to a person of ordinary skill in the art (and it is not to be limited to a special or customized meaning), and refers without limitation to the amount of organic carbon divided by the total amount of carbon (organic+petro) as determined by ASTM D6866. The meaning of the term "high bio-content" depends upon the user and the context. "Low" bio-content means <25% bio-content as grams farm derived chemical divided by the total grams of chemicals. "High" bio-content means >50% bio-content. And, "very high" bio-content mean >75% bio-content. The bio-contents of the following Honey Bee Polyols (Honey Bee Polyol, Corona, Calif., USA) are as follows: HB-150 is 90% bio based, HB-230 is 80% bio-based, and HB-56 formed by coupling is 84% bio-based. The hybrid petro- soy polyol described herein, known as HB-56 by prepol, is 60% bio-based.

The method of the illustrated invention includes the steps of forming, generating or synthesizing a petro-polyol prepolymer intermediate, and then coupling the petro-polyol prepolymer intermediate with a plant oil based polyol.

As shown in Formula I, below, an amount of petro-polyol prepolymer is formed from an amount of a petro-chemical polyol and an amount of an isocyanate.

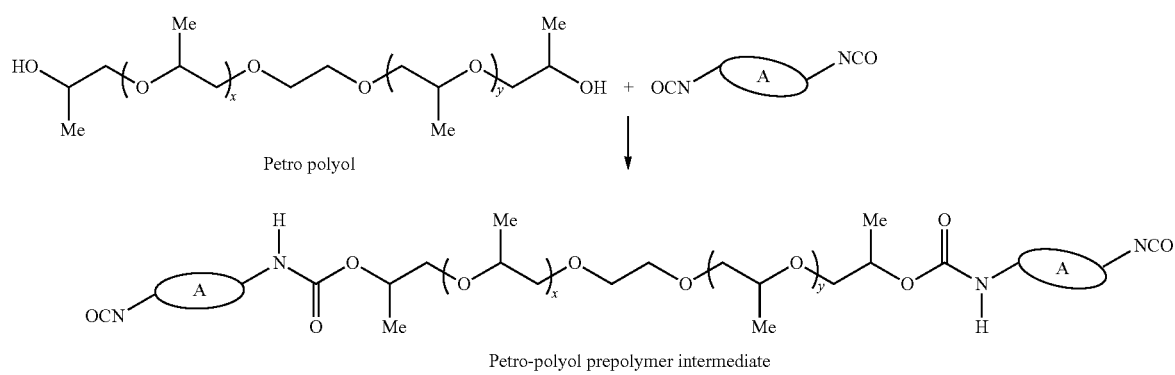

Petro polyol

Petro-polyol prepolymer intermediate

An amount of the petro-chemical polyol (Formula I top left) is mixed with an amount of the isocyanate (Formula I top right), and then the mixture of the petro-chemical polyol and the isocyanate is heated for a period of time, so as to form a petro-polyol prepolymer (Formula I bottom). Generally, the petro-polyol prepolymer is an unstable intermediate, which is not isolated. The petro-polyol prepolymer is discussed in additional detail below.

A variety of petro-chemical polyols, known in the art may be used to synthesize the petro-polyol prepolymer. Suitable petro-chemical polyols include but are not limited to polyether polyols, polyester polyols, polyamines, OH-terminated prepolymers thereof, and combinations thereof.

The isocyanate is generally an aromatic polyisocyanate or an aliphatic isocyanate. In some circumstances, mixtures of an aromatic polyisocyanate and an aliphatic isocyanate may be used. Suitable aromatic polyisocyanate include but are not limited to diphenylmethane-4,4'-diisocyanate (4,4'-MDI, methylene di-p-phenylene isocyanate, methylene (bisphenyl isocyanate), methyl diphenyl diisocyanate, or 4,4'-diaminodiphenylmethane diisocyanate), polymeric diphenylmethane-4,4'-diisocyanate (polymeric MDI), toluene diisocyanate (mixture of 2,4- and 2,6-isomers of toluene diisocyanate or TDI), NCO-terminated prepolymers and derivatives thereof, and combinations thereof. Suitable aliphatic isocyanate include but are not limited to methylenedicyclohexyl Diisocyanate ($H_{12}$-MDI), hexamethylene diisocyanate (HDMI or 1,6-diisocyanatohexane), isophorone diisocyanate (IPDI or 5-isocyanato-1(isocyanatomethyl)-1,3,3 trimethylcyclohexane), tetramethylxylidene diisocyanate (TMXDI, m-TMXDI, or tetramethyl-m-xylylene diisocyanate), NCO-terminated prepolymers and derivatives thereof, and combinations thereof.

Generally, the mixture is heated at a temperature of between about 50° F. (10° C.) and about 300° F. (149° C.). Generally, the mixture is stirred, such as to ensure uniform mixing during the period of heating. In some embodiments, the mixture is heated at a temperature of between about 150° F. (66° C.) and about 270° F. (132° C.). In other embodiments, the mixture is heated at a temperature of between about 160° F. (71° C.) and about 260° F. (127° C.). In still other embodiments, the mixture is heated at a temperature of between about 170° F. (77° C.) and about 250° F. (121° C.)

The mixture is heated from a period of time ranging from between about 30 minutes and about 24 hours. In some embodiments, the mixture is heated for a period of about 0.5 hours, 1.0 hours, 1.5 hours, 2.0 hours, 2.5 hours, 3.0 hours, 3.5 hours, 4.0 hours, 4.5 hours, 5.0 hours, 5.5 hours, 6.0 hours, 6.5 hours, 7.0 hours, 7.5 hours, 8.0 hours, 8.5 hours, 9.0 hours, 9.5 hours, 10.0 hours, 10.5 hours, 11.0 hours, 11.5 hours and 12.0 hours. In some embodiments, the mixture is heated for a period of time of between about 2 hours and about 4 hours.

After the heating has been completed, the reaction mixture, containing the petro-polyol prepolymer is generally cooled to a temperature of between about 100° F. (38° C.) and about 170° F. (77° C.). Cooling the reaction mixture, or the petro-polyol prepolymer, prior to mixing with the plant oil polyol ensured complete dispersal of the plant oil polyol in the petro-polyol prepolymer before the reaction therebetween starts. As is known in the art, complete dispersal of the plant oil polyol in the petro-polyol prepolymer reduces the risk of forming a "gumby," an over-crosslinked bit of polymer floating in the reaction product.

As shown in Formula II, below, the petro-polyol prepolymer of Formula I is coupled with a plant oil polyol, such as a soy oil polyol, to form a hybrid petro-plant oil polyol.

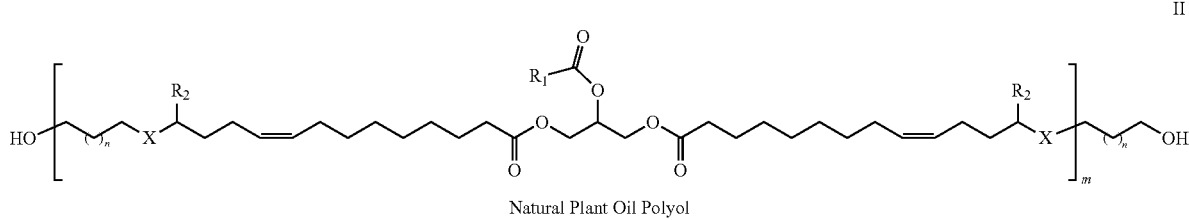

Natural Plant Oil Polyol

+

-continued

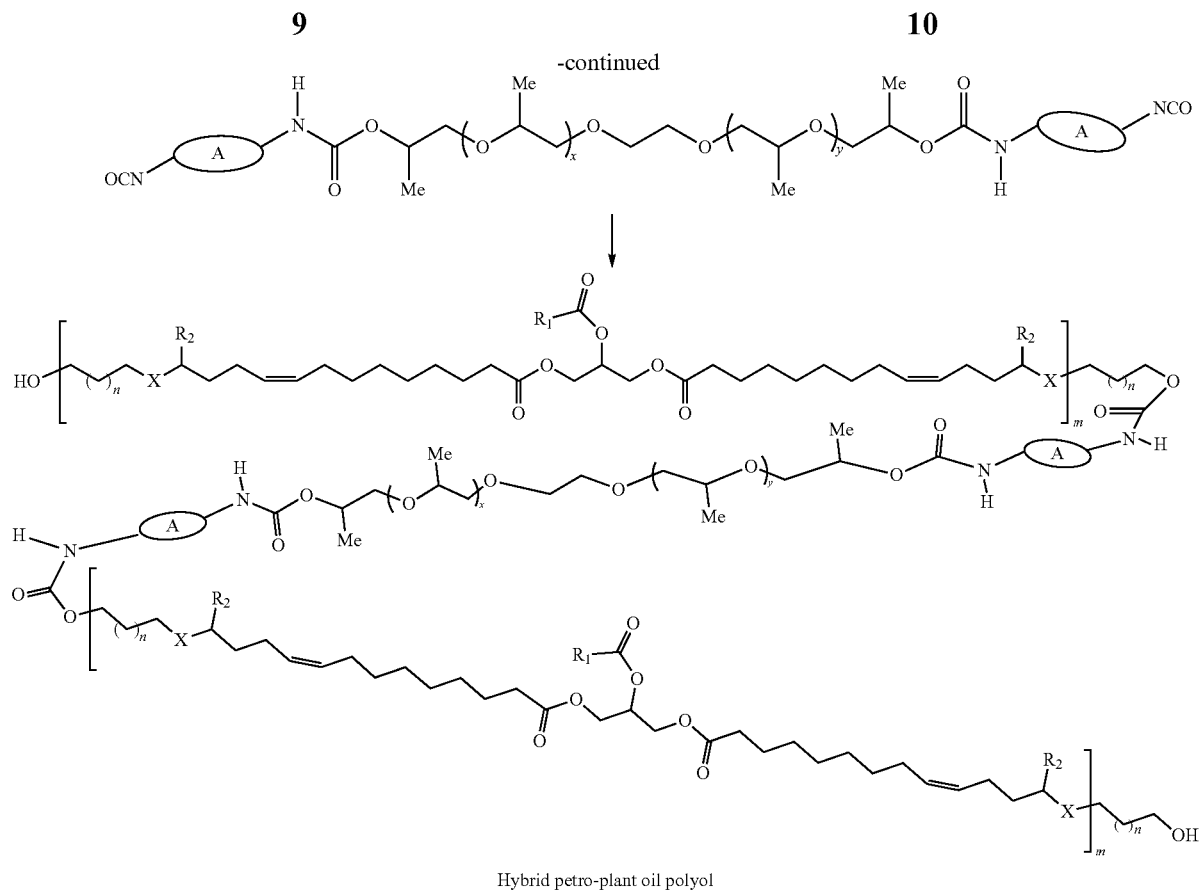

Hybrid petro-plant oil polyol

The cooled petro-polyol prepolymer (Formula II, middle) is mixed with an amount of a plant oil based polyol (Formula II, top). Suitable plant oil polyols, or natural plant oil polyols include but are not limited to corn oil polyol, soybean oil polyol, rapeseed oil polyol, sunflower oil polyol, sesame seed oil polyol, peanut oil polyol, safflower oil polyol, olive oil polyol, cotton seed oil polyol, linseed oil polyol, walnut oil polyol, tung oil polyol and combinations thereof. In preferred embodiments, the plant oil polyol is a soy oil polyol, which may be referred to as a soy oil-based polyol or soy polyol. In more preferred embodiments, the plant oil based polyol is a soybean oil polyol having a hydroxyl number of about 150. As suitable soybean oil polyol with a hydroxyl number of about 150 is HB-150, which is manufactured by Honey Bee Polyols (Honey Bee Polyol, Corona, Calif., USA).

The mixture of petro-polyol prepolymer and plant oil polyol is heated for period of time, so as to form an amount of a hybrid petro-plant oil polyol (Formula II, bottom), wherein the hybrid petro-plant oil polyol has a high bio-content and a hydroxyl number of between about 50 and 60, such as discussed above. In preferred embodiments, the hybrid petro-plant oil polyol is a hybrid petro-soy oil polyol. In preferred embodiments, the hybrid petro-soy oil polyol has a hydroxyl number of about 50 to about 60. For example, the hybrid petro-soy oil polyol may have a hydroxyl number of about 45, 46, 47, 48, 49, 50, 51, 52, 53, 54, 55, 56, 57, 58, 59, 60, 61, 62, 63, 64 or 65.

Generally, the mixture of petro-polyol prepolymer and plant oil polyol is heated at a temperature of between about 50° F. (10° C.) and about 300° F. (149° C.). The mixture may be stirred, such as to ensure uniform mixing during the period of heating. In some embodiments, the mixture is heated at a temperature of between about 150° F. (66° C.) and about 270° F. (132° C.). In other embodiments, the mixture is heated at a temperature of between about 160° F. (71° C.) and about 260° F. (127° C.). In still other embodiments, the mixture is heated at a temperature of between about 170° F. (77° C.) and about 250° F. (121° C.)

The mixture of petro-polyol prepolymer and plant oil polyol is heated from a period of time of from between about 30 minutes and about 24 hours. In some embodiments, the mixture is heated for a period of about 0.5 hours, 1.0 hours, 1.5 hours, 2.0 hours, 2.5 hours, 3.0 hours, 3.5 hours, 4.0 hours, 4.5 hours, 5.0 hours, 5.5 hours, 6.0 hours, 6.5 hours, 7.0 hours, 7.5 hours, 8.0 hours, 8.5 hours, 9.0 hours, 9.5 hours, 10.0 hours, 10.5 hours, 11.0 hours, 11.5 hours and 12.0 hours. In some embodiments, the mixture is heated for a period of time of between about 2 hours and about 4 hours.

It is believed the chemistry disclosed in the present application can be applied to synthetic oils, fossil fuel and derived oils, and oils from genetically engineered plants, as well as naturally occurring plant oils and blends of any of the above oils, as long as such oils include carbon-carbon double bonds on which to carry out the reaction. Also, homologue derivatives of plant polyols according to the invention are possible. For example, polyols of the invention may be ethoxylated or propoxylated to further resemble fossil fuel polyols.

The following examples of compositions according to the invention are provided for illustration. Any parts and percentages are by weight of the composition unless otherwise indicated.

EXAMPLE 1

| Component | Amount (grams) |
| --- | --- |
| Diphenylmethane diisocyanate | 12.80 |
| 2000 $M_r$ Polyether polyol diol | 19.20 |
| Honey Bee 150 soy polyol | 68.00 |

The above amounts of diphenylmethane diisocyanate and 2000-molecular weight polyether polyol diol were stirred for 2 hours at about 185° F., then cooled to about 120° F. The above amount of Honey Bee 150 soy polyol (MCP Industries, Inc., Corona, Calif., USA), a soy polyol with a hydroxyl number of 150, was added with stirring. The mixture was allowed to react at 180° F. with stirring to give 100.00 grams of polyol with a hydroxyl number of 55.

EXAMPLE 2

| Component | Amount (grams) |
| --- | --- |
| Diphenylmethane diisocyanate | 12.25 |
| 2000 $M_r$ Polyether polyol diol | 22.75 |
| Honey Bee 150 soy polyol | 65.00 |

The above amounts of diphenylmethane diisocyanate and 2000-molecular weight polyether polyol diol were stirred for 2.5 hours at about 185° F., then cooled to about 120° F. The above amount of Honey Bee 150 soy polyol (MCP Industries, Inc., Corona, Calif., USA), a soy polyol with a hydroxyl number of 150, was added with stirring. The mixture was allowed to react at 180° F. with stirring for an additional 3 hours to give 100.00 grams of polyol with a hydroxyl number of 56.

EXAMPLE 3

| Component | Amount (grams) |
| --- | --- |
| Diphenylmethane diisocyanate | 41.50 |
| 1000 $M_r$ Polyether polyol diol | 58.50 |
| Honey Bee 150 soy polyol | 185.71 |

The above amounts of diphenylmethane diisocyanate and 1000-molecular weight polyether polyol diol were stirred for 2 hours at about 180° F., then cooled to about 120° F. The above amount of Honey Bee 150 soy polyol (MCP Industries, Inc., Corona, Calif., USA), a soy polyol with a hydroxyl number of 150, was added with stirring. The mixture was allowed to react at 180° F. with stirring for an additional 3 hours to give 285.71 grams of polyol with a hydroxyl number of 55.

EXAMPLE 4

| Component | Amount (grams) |
| --- | --- |
| Diphenylmethane diisocyanate | 31.20 |
| 4000 $M_r$ Polyether polyol diol | 68.80 |
| Honey Bee 150 soy polyol | 185.71 |

The above amounts of diphenylmethane diisocyanate and 4000-molecular weight polyether polyol diol were stirred for 2 hours at about 185° F., then cooled to about 120° F. The above amount of Honey Bee 150 soy polyol (MCP Industries, Inc., Corona, Calif., USA), a soy polyol with a hydroxyl number of 150, was added with stirring. The mixture was allowed to react at 180° F. with stirring for an additional 4 hours to give 285.71 grams of polyol with a hydroxyl number of 56.

EXAMPLE 5

| Component | Amount (grams) |
| --- | --- |
| Diphenylmethane diisocyanate | 40.00 |
| 4000 $M_r$ Polyether polyol diol | 60.00 |
| Honey Bee 150 soy polyol | 233.30 |

The above amounts of diphenylmethane diisocyanate and 4000-molecular weight polyether polyol diol were stirred for 2 hours at about 185° F., then cooled to about 120° F. The above amount of Honey Bee 150 soy polyol (MCP Industries, Inc., Corona, Calif., USA), a soy polyol with a hydroxyl number of 150, was added with stirring. The mixture was allowed to react at 180° F. with stirring for an additional 3 hours to give 333.30 grams of polyol with a hydroxyl number of 57.

EXAMPLE 6

| Component | Amount (grams) |
| --- | --- |
| Diphenylmethane diisocyanate | 56.50 |
| 2000 $M_r$ Polyether polyol diol | 43.50 |
| Honey Bee 150 soy polyol | 233.30 |

The above amounts of diphenylmethane diisocyanate and 2000-molecular weight polyether polyol diol were stirred for 2 hours at about 185° F., then cooled to about 120° F. The above amount of Honey Bee 150 soy polyol (MCP Industries, Inc., Corona, Calif., USA), a soy polyol with a hydroxyl number of 150, was added with stirring. The mixture was allowed to react at 180° F. with stirring for an additional 3 hours to give 333.30 grams of polyol with a hydroxyl number of 57.

EXAMPLE 7

| Component | Amount (grams) |
|---|---|
| Diphenylmethane diisocyanate | 50.00 |
| 1000 $M_r$ Polyether polyol diol | 50.00 |
| Honey Bee 150 soy polyol | 239.00 |

The above amounts of diphenylmethane diisocyanate and 1000-molecular weight polyether polyol diol were stirred for 2 hours at about 185° F., then cooled to about 120° F. The above amount of Honey Bee 150 soy polyol (MCP Industries, Inc., Corona, Calif., USA), a soy polyol with a hydroxyl number of 150, was added with stirring. The mixture was allowed to react at 180° F. with stirring for an additional 4 hours to give 339.00 grams of polyol with a hydroxyl number of 57.

EXAMPLE 8

| Component | Amount (grams) |
|---|---|
| Diphenylmethane diisocyanate | 36.50 |
| 4000 $M_r$ Polyether polyol diol | 63.50 |
| Honey Bee 150 soy polyol | 312.50 |

The above amounts of diphenylmethane diisocyanate and 4000-molecular weight polyether polyol diol were stirred for 2 hours at about 180° F., then cooled to about 120° F. The above amount of Honey Bee 150 soy polyol (MCP Industries, Inc., Corona, Calif., USA), a soy polyol with a hydroxyl number of 150, was added with stirring. The mixture was allowed to react at 180° F. with stirring for an additional 3 hours to give 339.00 grams of polyol with a hydroxyl number of 56.

EXAMPLE 9

| Component | Amount (grams) |
|---|---|
| Diphenylmethane diisocyanate | 46.00 |
| 1000 $M_r$ Polyether polyol diol | 54.00 |
| Honey Bee 150 soy polyol | 212.50 |

The above amounts of diphenylmethane diisocyanate and 1000-molecular weight polyether polyol diol were stirred for 2 hours at about 180° F., then cooled to about 120° F. The above amount of Honey Bee 150 soy polyol (MCP Industries, Inc., Corona, Calif., USA), a soy polyol with a hydroxyl number of 150, was added with stirring. The mixture was allowed to react at 180° F. with stirring for an additional 3 hours to give 312.50 grams of polyol with a hydroxyl number of 55.

EXAMPLE 10

| Component | Amount (grams) |
|---|---|
| Diphenylmethane diisocyanate | 30.00 |
| 2000 $M_r$ Polyether polyol diol | 70.00 |
| Honey Bee 150 soy polyol | 159.74 |

The above amounts of diphenylmethane diisocyanate and 2000-molecular weight polyether polyol diol were stirred for 2 hours at about 185° F., then cooled to about 120° F. The above amount of Honey Bee 150 soy polyol (MCP Industries; Inc., Corona, Calif., USA), a soy polyol with a hydroxyl number of 150, was added with stirring. The mixture was allowed to react at 180° F. with stirring for an additional 3 hours to give 259.74 grams of polyol with a hydroxyl number of 56.

EXAMPLE 11

| Component | Amount (grams) |
|---|---|
| Diphenylmethane diisocyanate | 37.00 |
| 1000 $M_r$ Polyether polyol diol | 63.00 |
| Honey Bee 150 soy polyol | 159.74 |

The above amounts of diphenylmethane diisocyanate and 1000-molecular weight polyether polyol diol were stirred for 2 hours at about 180° F., then cooled to about 120° F. The above amount of Honey Bee 150 soy polyol (MCP Industries, Inc., Corona, Calif., USA), a soy polyol with a hydroxyl number of 150, was added with stirring. The mixture was allowed to react at 180° F. with stirring for an additional 3 hours to give 259.74 grams of polyol with a hydroxyl number of 56.

EXAMPLE 12

| Component | Amount (grams) |
|---|---|
| Diphenylmethane diisocyanate | 28.50 |
| 4000 $M_r$ Polyether polyol diol | 71.50 |
| Honey Bee 150 soy polyol | 159.74 |

The above amounts of diphenylmethane diisocyanate and 4000-molecular weight polyether polyol diol were stirred for 2 hours at about 180° F., then cooled to about 120° F. The above amount of Honey Bee 150 soy polyol (MCP Industries, Inc., Corona, Calif., USA), a soy polyol with a hydroxyl number of 150, was added with stirring. The mixture was allowed to react at 180° F. with stirring for an additional 3 hours to give 259.74 grams of polyol with a hydroxyl number of 56.

EXAMPLE 13

| Component | Amount (grams) |
|---|---|
| Diphenylmethane diisocyanate | 39.60 |
| 2000 $M_r$ Polyether polyol diol | 60.40 |
| Honey Bee 150 soy polyol | 177.78 |

The above amounts of diphenylmethane diisocyanate and 2000-molecular weight polyether polyol diol were stirred for 2 hours at about 185° F., then cooled to about 120° F. The above amount of Honey Bee 150 soy polyol (MCP Industries, Inc., Corona, Calif., USA), a soy polyol with a hydroxyl number of 150, was added with stirring. The mixture was allowed to react at 180° F. with stirring for an additional 3 hours to give 277.78 grams of polyol with a hydroxyl number of 57.

EXAMPLE 14

| Component | Amount (grams) |
|---|---|
| Diphenylmethane diisocyanate | 33.00 |
| 1000 $M_r$ Polyether polyol diol | 67.00 |
| Honey Bee 150 soy polyol | 177.78 |

The above amounts of diphenylmethane diisocyanate and 1000-molecular weight polyether polyol diol were stirred for 2 hours at about 180° F., then cooled to about 120° F. The above amount of Honey Bee 150 soy polyol (MCP Industries, Inc., Corona, Calif., USA), a soy polyol with a hydroxyl number of 150, was added with stirring. The mixture was allowed to react at 180° F. with stirring for an additional 3 hours to give 177.78 grams of polyol with a hydroxyl number of 56.

EXAMPLE 15

| Component | Amount (grams) |
|---|---|
| Diphenylmethane diisocyanate | 29.00 |
| 4000 $M_r$ Polyether polyol diol | 71.00 |
| Honey Bee 150 soy polyol | 177.78 |

The above amounts of diphenylmethane diisocyanate and 4000-molecular weight polyether polyol diol were stirred for 2 hours at about 180° F., then cooled to about 120° F. The above amount of Honey Bee 150 soy polyol (MCP Industries, Inc., Corona, Calif., USA), a soy polyol with a hydroxyl number of 150, was added with stirring. The mixture was allowed to react at 180° F. with stirring for an additional 3 hours to give 277.78 grams of polyol with a hydroxyl number of 57.

It is to be understood that while certain forms of the present invention have been described herein, it is not to be limited to the specific forms or arrangement as described and shown.

What is claimed and desired to be secured by Letters Patent is as follows:

1. A process of coupling a soy oil based polyol with a petro-chemical polyol to produce a hybrid petro-soybean oil polyol having a high bio-content, a hydroxyl number of between about 50 and about 60 containing a structure having the following formula:

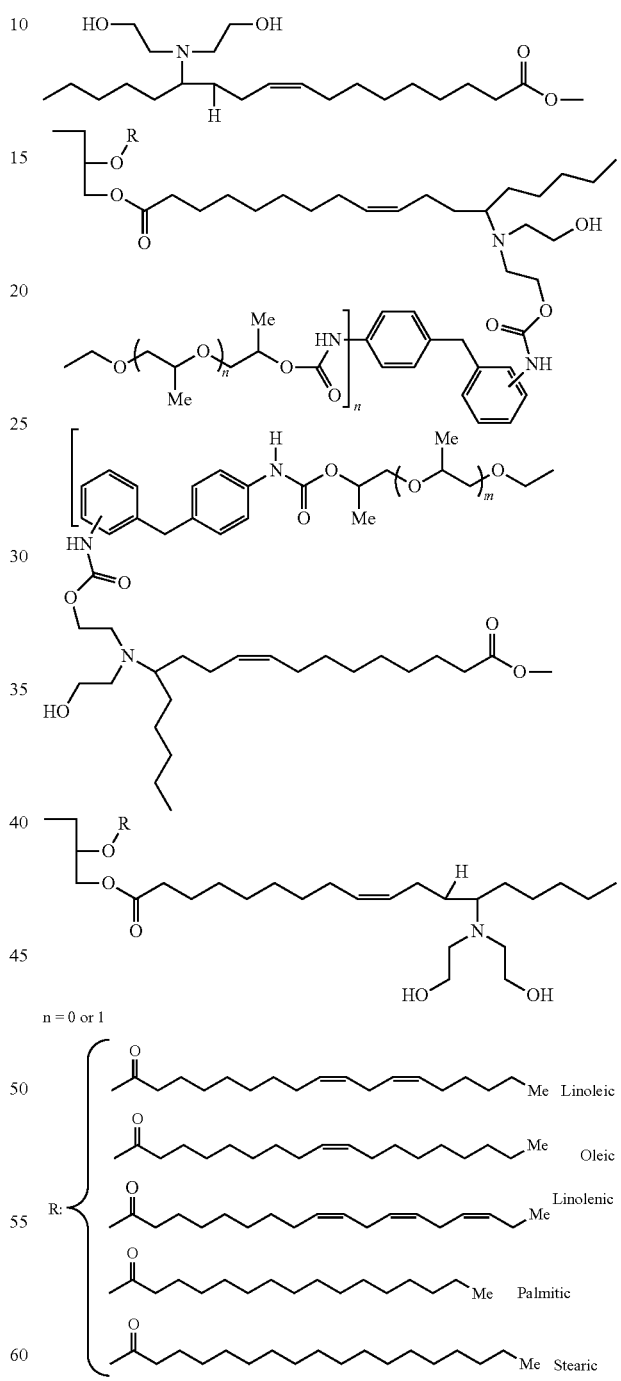

the process comprising:
a) forming a mixture including a petro-chemical polyol and an isocyanate;
b) heating the mixture of step a) for a period of time to form a petro-polyol prepolymer;

c) cooling the petro-polyol prepolymer;
d) forming a mixture including the cooled petro-polyol prepolymer with a soybean oil based polyol having the structure;

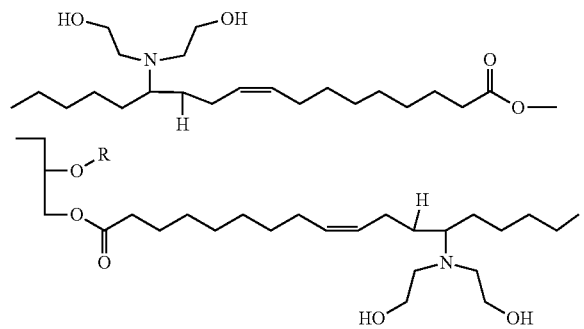

R:

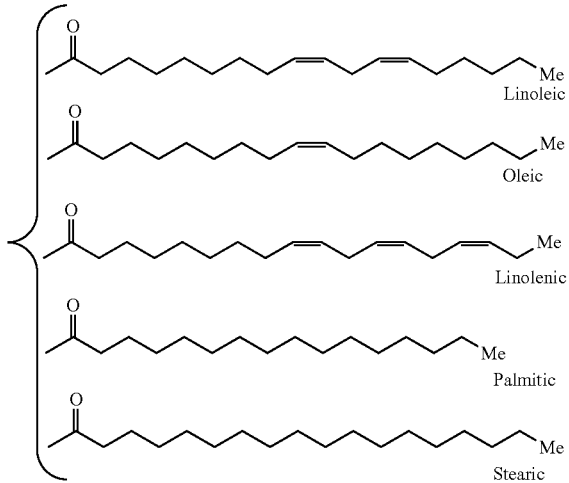

and
e) heating the mixture of step d) for a period of time to form a hybrid petro-soybean oil polyol having a high bio-content and a hydroxyl number of between about 50 and 60.

2. The process of claim 1 wherein the petro-chemical polyol is selected from the group consisting of polyether polyols, polyester polyols, polyamines, OH-terminated prepolymers thereof, and combinations thereof.

3. The process of claim 1 wherein the isocyanate is selected from the group consisting of aromatic polyisocyanates and aliphatic isocyanates.

4. The process of claim 3, wherein the aromatic polyisocyanate is selected from the group consisting of diphenylmethane-4,4'-diisocyanate, polymeric diphenylmethane-4,4'-diisocyanate, toluene diisocyanate, NCO-terminated prepolymers and derivatives thereof, and combinations thereof.

5. The process of claim 3, wherein the aliphatic isocyanate is selected from the group consisting of methylenedicyclohexyl diisocyanate, hexamethylene diisocyanate, isophorone diisocyanate, tetramethylxylidene diisocyanate, NCO-terminated prepolymers and derivatives thereof, and combinations thereof.

6. The process of claim 1 wherein step b) includes heating the mixture of step a) at a temperature of between about 50° F. (10° C.) and about 300° F. (149° C.)

7. The process of claim 1 wherein step b) includes heating the mixture of step a) at a temperature of between about 150° F. (66° C.) and about 270° F. (132° C.)

8. The process of claim 1 wherein step b) includes heating the mixture of step a) at a temperature of between about 160° F. (71° C.) and about 260° F. (127° C.)

9. The process of claim 1 wherein step b) includes heating the mixture of step a) at a temperature of between about 170° F. (77° C.) and about 250° F. (121° C.)

10. The process of claim 1 wherein the period of time of step b) is a period of time of between about 30 minutes and about 24 hours.

11. The process of claim 1 wherein the period of time of step b) is selected from the group consisting of 0.5 hours, 1.0 hours, 1.5 hours, 2.0 hours, 2.5 hours, 3.0 hours, 3.5 hours, 4.0 hours, 4.5 hours, 5.0 hours, 5.5 hours, 6.0 hours, 6.5 hours, 7.0 hours, 7.5 hours, 8.0 hours, 8.5 hours, 9.0 hours, 9.5 hours, 10.0 hours, 10.5 hours, 11.0 hours, 11.5 hours and 12.0 hours.

12. The process of claim 1 wherein step c) includes cooling the petro-polyol prepolymer to a temperature of between about 100° F. (38° C.) and about 170° F. (77° C.)

13. The process of claim 1 wherein step e) includes heating the mixture of step d) at a temperature of between about 50° F. (10° C.) and about 300° F. (149° C.)

14. The process of claim 1 wherein step e) includes heating the mixture of step d) at a temperature of between about 150° F. (66±° C.) and about 270° F. (132° C.)

15. The process of claim 1 wherein step e) includes heating the mixture of step d) at a temperature of between about 160° F. (71±° C.) and about 260° F. (127° C.)

16. The process of claim 1 wherein step e) includes heating the mixture of step d) at a temperature of between about 170° F. (77° C.) and about 250° F. (121° C.)

17. The process of claim 1 wherein the period of time of step e) is a period of time of between about 30 minutes and about 24 hours.

18. The process of claim 1 wherein the period of time of step e) is selected from the group consisting of 0.5 hours, 1.0 hours, 1.5 hours, 2.0 hours, 2.5 hours, 3.0 hours, 3.5 hours, 4.0 hours, 4.5 hours, 5.0 hours, 5.5 hours, 6.0 hours, 6.5 hours, 7.0 hours, 7.5 hours, 8.0 hours, 8.5 hours, 9.0 hours, 9.5 hours, 10.0 hours, 10.5 hours, 11.0 hours, 11.5 hours and 12.0 hours.

19. The process of claim 1 wherein the hybrid petro-plant oil polyol of step e) includes a hybrid petro-plant oil polyol having more than 50% bio-content, wherein bio-content is a ratio of the organic carbon content to the total carbon content.

20. A hybrid petro-soybean oil polyol having a high bio-content and a hydroxyl number of between about 50 and 60 synthesized from soybean oil based polyol having the structure with the following formula:

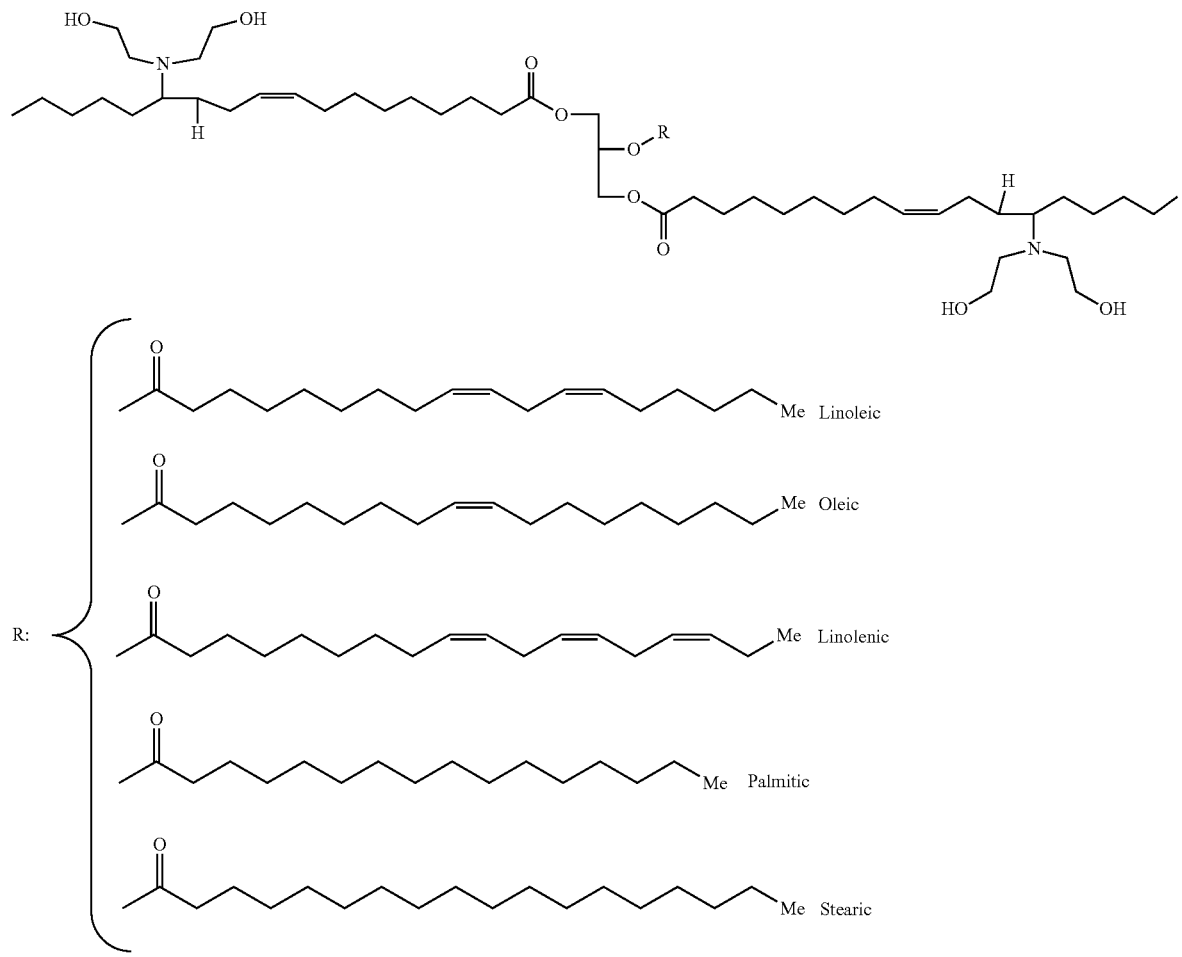

and wherein the soybean oil polyol has a hydroxyl number of between about 100 and about 200 according to the method of claim 1.

21. The process of claim 20 wherein the soybean oil based polyol has a hydroxyl number of about 150.

22. The process of claim 21 wherein the hybrid petro-soy oil polyol has a hydroxyl number of about 55 to about 57.

23. The process of claim 1 wherein the plant oil based polyol is a soybean oil polyol having a hydroxyl number of about 150.

24. The process of claim 23 wherein the hybrid petro-soy oil polyol has a hydroxyl number of about 55 to about 57.

\* \* \* \* \*